(12) United States Patent
Hasegawa et al.

(10) Patent No.: US 11,967,174 B2
(45) Date of Patent: Apr. 23, 2024

(54) VERIFICATION SYSTEM AND VERIFICATION SERVER

(71) Applicant: HITACHI KOKUSAI ELECTRIC INC., Tokyo (JP)

(72) Inventors: Keigo Hasegawa, Tokyo (JP); Hiroto Sasao, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 516 days.

(21) Appl. No.: 17/265,911

(22) PCT Filed: Sep. 11, 2018

(86) PCT No.: PCT/JP2018/033588
§ 371 (c)(1),
(2) Date: Feb. 4, 2021

(87) PCT Pub. No.: WO2020/053953
PCT Pub. Date: Mar. 19, 2020

(65) Prior Publication Data
US 2021/0192183 A1     Jun. 24, 2021

(51) Int. Cl.
*G06T 7/136* (2017.01)
*G06T 7/00* (2017.01)
(Continued)

(52) U.S. Cl.
CPC .............. *G06V 40/165* (2022.01); *G06T 7/00* (2013.01); *H04L 67/01* (2022.05);
(Continued)

(58) Field of Classification Search
CPC .... G06V 40/165; G06V 40/172; G06T 7/136; G06T 7/00; G06T 2211/441; H04L 67/01; H04L 67/568; H04L 67/1097
See application file for complete search history.

(56) References Cited

U.S. PATENT DOCUMENTS

| 9,679,075 B1 * | 6/2017 | Kolam ................... H04L 67/02 |
| 2007/0288759 A1 * | 12/2007 | Wood ................... G06Q 20/341 |
| | | 713/186 |

(Continued)

FOREIGN PATENT DOCUMENTS

| JP | 2000215316 A * | 8/2000 |
| JP | 2000215316 A * | 8/2000 |

(Continued)

OTHER PUBLICATIONS

Supplemental EP Search Report issued in EP application No. 18 93 3358, dated Mar. 29, 2022.

(Continued)

*Primary Examiner* — Shaghayegh Azima
(74) *Attorney, Agent, or Firm* — Greer Burns & Crain Ltd.

(57) ABSTRACT

The cloud server holds the main database for storing all the registration data that is handled in the present system, and the edge server that is arranged close to the sensor holds a sub-database for storing part of the registration data. The sub-database in the edge server stores only the registration data having a high probability of being verified in the edge server. In the case where the edge server verifies the detection data that has been acquired by the sensor with the registration data within the sub-database and determines that the registration data that matches the detection data does not exist within the sub-database, the configuration allows the detection data to be transmitted to the cloud server and requests the detection data to be verified with the registration data within the main database.

9 Claims, 7 Drawing Sheets

(51) Int. Cl.
*G06V 40/16* (2022.01)
*H04L 67/01* (2022.01)
*H04L 67/1097* (2022.01)
*H04L 67/568* (2022.01)

(52) U.S. Cl.
CPC ........ *H04L 67/1097* (2013.01); *H04L 67/568* (2022.05); *G06T 7/136* (2017.01); *G06T 2211/441* (2023.08)

(56) References Cited

U.S. PATENT DOCUMENTS

| | | | | |
|---|---|---|---|---|
| 2010/0058449 | A1* | 3/2010 | Kamakura | H04L 67/1008 726/6 |
| 2018/0130225 | A1* | 5/2018 | Hatanaka | G06V 10/772 |
| 2021/0125617 | A1* | 4/2021 | Park | G06F 16/683 |

FOREIGN PATENT DOCUMENTS

| | | | |
|---|---|---|---|
| JP | 2006085268 | A * | 3/2006 |
| JP | 2006085268 | A | 3/2006 |
| JP | 2014002634 | A * | 1/2014 |
| JP | 2014002634 | A | 1/2014 |
| JP | 2017152852 | A | 8/2017 |
| JP | 2018045369 | A * | 3/2018 |
| JP | 2018045369 | A | 3/2018 |

OTHER PUBLICATIONS

ISR issued in Int'l. Application No. PCT/JP2018/033588, dated Nov. 20, 2018 (with translation).
1 Office action issued in corresponding Japanese patent application No. dated, 2020-546574, dated Jan. 13, 2022.

* cited by examiner

VERIFICATION SYSTEM AND VERIFICATION SERVER

This is a National Phase Application filed under 35 U.S.C. § 371, of International Application No. PCT/JP2018/033588, filed Sep. 11, 2018, the contents of which are incorporated by reference.

TECHNICAL FIELD

The present invention pertains to a verification system for verifying the registration data that has been registered in advance with the detection data acquired by a detection apparatus.

BACKGROUND ART

In recent years, artificial intelligence (AI) has drawn attention and is actively used in various fields including image/speech sound recognition, demand prediction and abnormality detection. Most parts of AI are equipped in a cloud server, and data that has been acquired by a camera, a microphone, a sensor or the like is put together on the cloud side via a network so as to be analyzed. In addition, a sensor network for sensing the state of an apparatus or an environment by means of a sensor attached to various types of things as that being referred to as the Internet of Things (IoT) has been developed together with AI. As a result, the load placed on a network or a crowd server that handles an enormous amount of data, which is referred to as big data, is continuously increasing.

In recent years, edge computing has attracted attention where the load placed on the crowd server or the communication load is reduced by arranging a calculation resource in the vicinity of a portable phone, a smartphone, a sensor or the like that are at an edge of a network. For example, Patent Literature 1 discloses an invention according to which the load on the cloud server can be reduced and the real-time characteristics of a process can be increased by arranging an edge node in the edge portion on the user side of a network that connects the cloud server to an end user so that the edge node can carry out a process instead of the cloud server.

PRIOR ART LITERATURE

Patent Literature

Patent Literature 1: JP2017-152852A

SUMMARY OF THE INVENTION

Problems to be Solved

The following can be cited as an example of the merits of cloud computing and edge computing.

In authentication systems (facial authentication, fingerprint authentication, iris authentication, license plate number authentication and the like) used for the security of a facility, real-time characteristics are required, and at the same time, an image analysis engine for verification and a search/verification server become necessary. In the case where the facility is large scale, the number of items registered in a database for verification is large with a great number of authentication terminals and sensors, and therefore, such a problem arises that the load on the network and the load on the server increase. In order to increase the scale of the system of which the operation has started at a small scale, not only the database but also the calculation performance itself must be increased, and therefore, such a problem arises concerning the cost that intensification of the system becomes necessary by replacing the server.

In the case where the functions of image analysis and verification are implemented in an edge device that is integrated with a sensor or in an edge server that is integrated with a gateway, it is not necessary to simultaneously process the authentications of a large number of people or cars with one server, and therefore, it is possible to disperse the calculation load or the communication load. In the case where the number of sensors is large, the system can be easily expanded by adding a small-scale server, which is also a merit.

When a large number of people or cars is registered in the database in an edge server, however, such a problem arises that the edge server is of a large scale. Usually, an edge server uses a calculator and a storage that are of a scale smaller than those in the cloud server, and therefore, there is a case where the storage capacity and the calculation rate that are sufficient for the construction of a database cannot be secured. In this case, it is necessary for the cloud server to finally authenticate even in the case where data analysis is carried out in the edge server, and thus, the load is not dispersed sufficiently.

The same can be applied to the systems other than authentication systems. In a system for controlling an actuator such as in a robot in response to sensing data, for example, it is necessary for events to be detected on the basis of the data acquired from a large number of sensors, for the events to be classified taking the combinations of the events into consideration, and for the control that is to be carried out in response to the event to be search processed. Therefore, the calculation load of the server increases in response to an increase in the number of sensors or actuators, and thus, an edge process that can be implemented in a small scale is required.

The present invention is provided in view of the above-described conventional situation, and an object thereof is to provide a verification system where it is possible to reduce the load of the cloud server, and reduce the communication amount between the cloud server and the edge server.

Solution to Problems

In order to achieve the above-described object, the present invention provides a verification system having the following configuration.

(1) A verification system for verifying detection data acquired by a detection apparatus with registration data that has been registered in advance is provided with: a first verification server having a main database for storing all the registration data; and a second verification server which is arranged closer to the detection apparatus than the first verification server and has a sub-database for storing part of the registration data, and is characterized in that the second verification server verifies the detection data that has been acquired by the detection apparatus with the registration data within the sub-database, and transmits the detection data to the first verification server in the case where it has been determined that no registration data that matches the detection data exists within the sub-database, and the first verification server verifies the detection data that has been received from the second verification server with the registration data within the main database, and transmits the verification results to the second verification server.

(2) The verification system according to the above (1) is characterized in that the first and second verification servers respectively have a data analysis unit that analyzes detection data, a verification unit that calculates the matching degree between the detection data and the registration data on the basis of the results of analysis by the data analysis unit, and a model storage unit that stores an inference model to be used for the analysis in the data analysis unit, and the respective model storage units in the first and second verification servers store the same inference model.

(3) The verification system according to the above (2) is characterized in that the verification unit in the second verification server compares the calculated matching degree with a predetermined determination reference value so as to determine whether or not registration data that matches the detection data which has been acquired by the detection apparatus exists within the sub-database, and the verification unit in the first verification server compares the calculated matching degree with a predetermined determination reference value so as to determine whether or not registration data that matches the detection data which has been acquired by the detection apparatus exists within the main database.

(4) The verification system according to the above (2) is characterized in that the first verification server has: a learning data storage unit that stores detection data that has been acquired by the detection apparatus as learning data in the case where the matching degree calculated by the first or second verification server on the basis of the detection data is within a predetermined range; and a learning unit that relearns an inference model on the basis of the learning data stored in the learning data storage unit.

(5) The verification system according to the above (4) is characterized in that the first verification server stores an inference model that has been relearned by the learning unit in its own model storage unit and transmits the inference model to the second verification server, and the second verification server stores the inference model that has been received from the first verification server in its own model storage unit.

(6) The verification system according to the above (1) is characterized in that the second verification server calculates the number of times of verification for each piece of registration data on the basis of the history of the results of verifications by means of the first or second verification server, selects a predetermined number of pieces of registration data in the order of the number of times of verification thereof being greater so as to confirm whether or not each selected piece of registration data exists within the sub-database, and receives the pieces of registration data that do not exist within the sub-database from the first verification server so as to store the received pieces of registration data in the sub-database.

(7) The verification system according to the above (1) is characterized by being applied to a facial authentication system for acquiring a face image of a person as detection data by means of an image pickup device, which is the detection apparatus, in order to determine whether or not the person is a person who has already been registered by verifying the face image with the registration data.

Advantageous Effects of the Invention

The present invention can provide a verification system where it is possible to reduce the load on the cloud server, and reduce the communication amount between the cloud server and the edge server.

DESCRIPTION OF EMBODIMENTS

In the following, the verification system according to one embodiment of the present invention is described in reference to the drawings. Here, in each drawing that is referred to in the following description, the same components as those in the other drawings are denoted by the same symbols.

Figure 1:
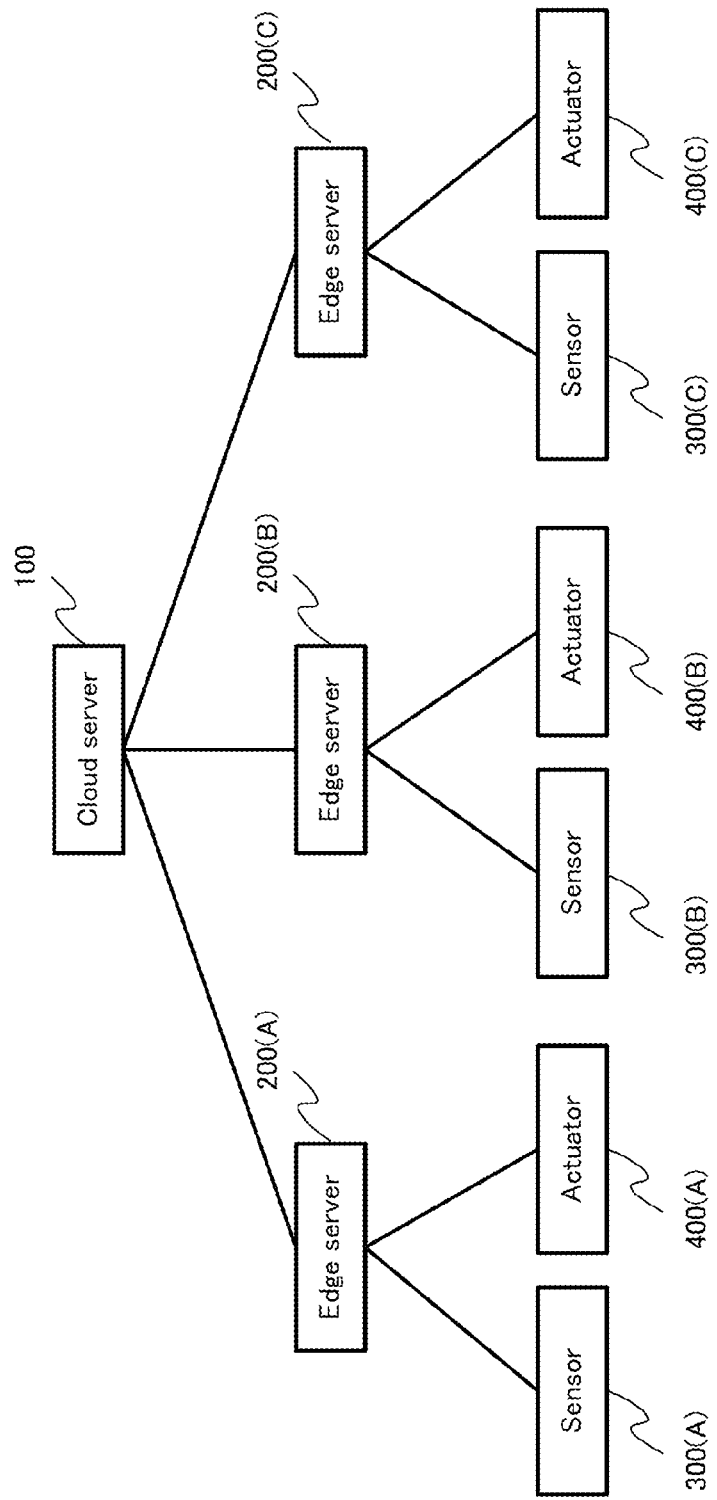
FIG. 1 is a schematic diagram showing the configuration of the verification system according to one embodiment of the present invention.

FIG. 1 schematically shows the configuration of the verification system according to one embodiment of the present invention.

The present verification system is provided with a cloud server 100, edge servers 200, sensors 300 and actuators 400. The present verification system is configured to verify the detection data acquired by the sensors 300 with the registration data that has been registered in advance in the database in the edge servers 200 or the cloud server 100, and control the actuators 400 on the basis of the results of the verification. In the present example, the cloud server 100 corresponds to the first verification server according to the present invention, the edge servers 200 correspond to the second verification server according to the present invention, and the sensors 300 correspond to the detection apparatus according to the present invention.

In FIG. 1, the edge server 200(A) that is connected to the sensor 300(A) and the actuator 400(A), the edge server 200(B) that is connected to the sensor 300(B) and the actuator 400(B), and the edge server 200(C) that is connected to the sensor 300(C) and the actuator 400(C) are connected to the cloud server 100. The edge servers 200 are connected to the cloud server 100 via the Internet, for example. In addition, the terminal apparatuses such as the sensors 300 and the actuators 400 are connected to the edge servers 200 via an Intranet or an exclusive bus, for example. Here, merely one example is cited for the above-described connection system, and the components (respective apparatuses and servers) in the present system can be connected via various types of networks wirelessly or with cables.

Here, the edge servers 200, the sensors 300 and the actuators 400 shown in FIG. 1 merely express examples of the entities that are arranged on the edges (user side) in the network and may be formed of other devices. For example, an edge server and a terminal apparatus (a sensor or an actuator) may be mounted on the same piece of hardware as an edge device. A plurality of sensors or actuators may be connected to one edge server. The number of sensors or actuators that are connected to one edge server is arbitrary.

The sensors 300 are apparatuses for acquiring detection data to be verified by an edge server 200 or the cloud server 100. Various types of sensors such as an image pickup device (camera) for taking an image in a predetermined range so as to output image data, a thermometer for measuring the ambient temperature so as to output temperature data, or an acceleration sensor for measuring the acceleration that is applied to itself so as to output oscillation data can be used as the sensors 300.

The actuators 400 are apparatuses that are controlled in accordance with the results of the verification of the detection data. Various types of output apparatuses such as a monitor, a speaker and a lamp in place of or together with the actuators 400 may be formed so as to be controlled in accordance with the results of the verification of the detection data.

The edge servers 200 are arranged closer to the terminal apparatuses than the cloud server 100. Here, "closer" means closer in distance over the space of the network (that is to say, the communication time is shorter) and does not mean closer in the physical distance. Here, in general, the communication time is shorter (or longer) when the physical distance is closer (or longer), and therefore in many cases, the physical distance and the distance over the space of the network correlate linearly.

The manners where an edge server 200 is arranged closer to a terminal apparatus than the cloud server 100 include the following examples ((A) through (D)). Here, they are merely examples and may be arranged in another manner.
  (A) The edge server 200 is formed as a device that is integrated with the terminal apparatus (edge device).
  (B) The terminal apparatus is connected to the edge server 200 through a cable or wirelessly over a close distance so as to be communicable.
  (C) The edge server 200 is arranged within a local network within which the terminal apparatus is located, and the cloud server 100 is arranged in an external network.
  (D) The edge server 200 is arranged in the middle of the network route between the terminal apparatus and the cloud server 100.

Figure 2:
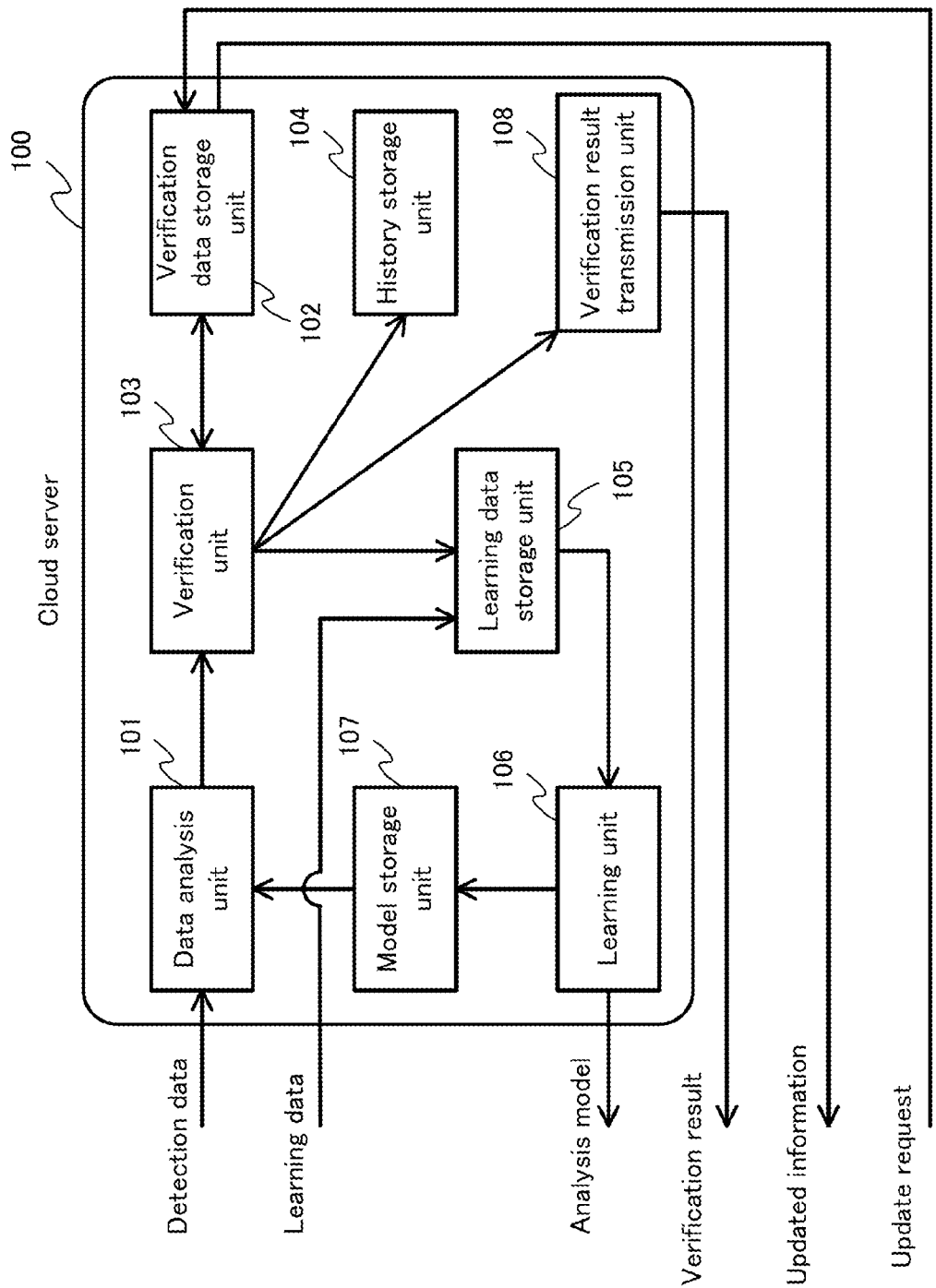
FIG. 2 is a diagram showing an example of a functional block arrangement in the cloud server in the verification system in FIG. 1.
Figure 3:
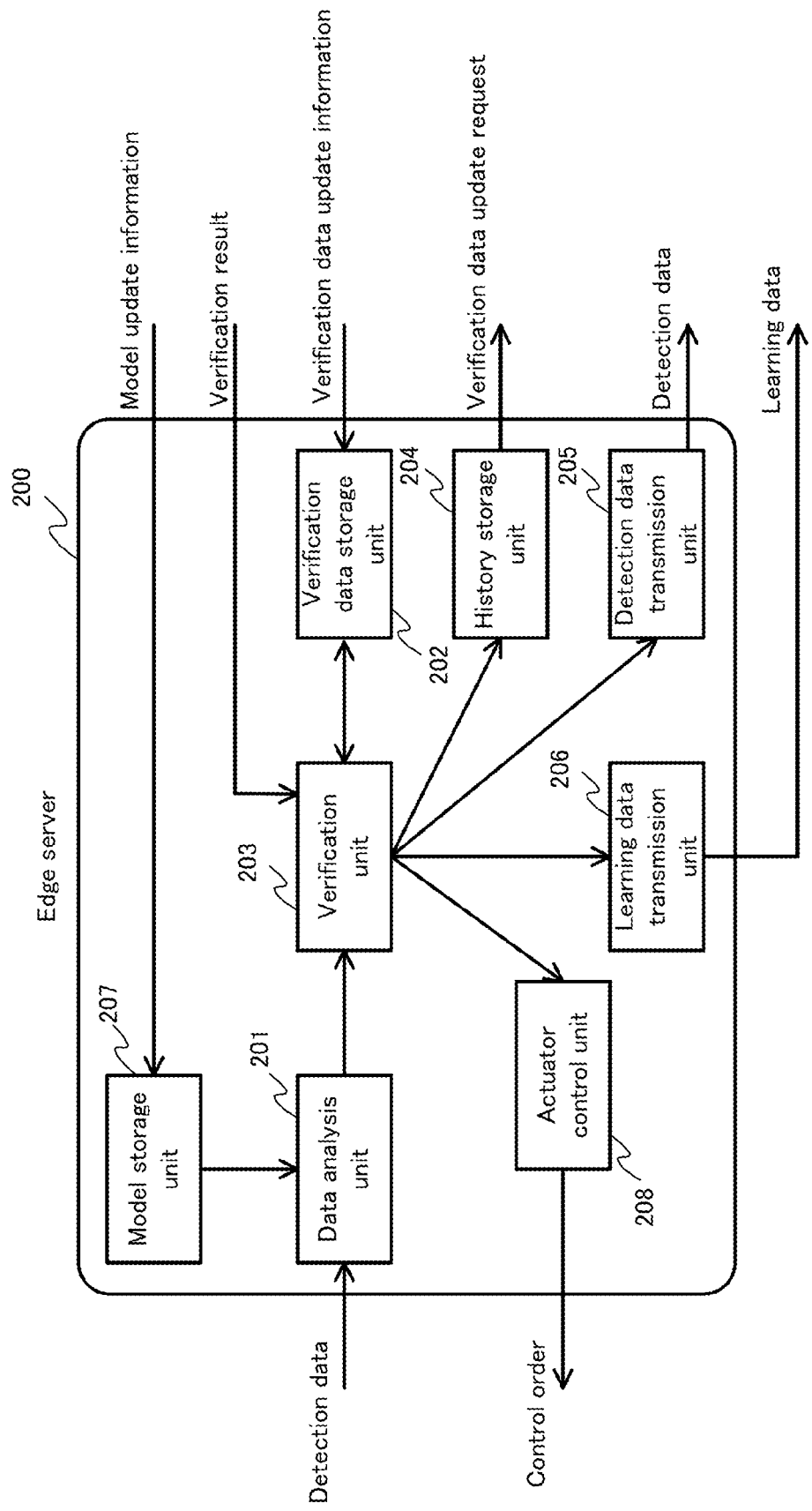
FIG. 3 is a diagram showing an example of a functional block arrangement in the edge server in the verification system in FIG. 1.

FIG. 2 shows an example of a functional block of the cloud server 100. In addition, FIG. 3 shows an example of a functional block of an edge server 200. The cloud server 100 has a function for intensively controlling the system in addition to a function for complementing the operation of the edge server 200.

First, the functions of the edge server 200 are described in reference to FIG. 3. The edge server 200 is provided with a data analysis unit 201, a verification data storage unit 202, a verification unit 203, a history storage unit 204, a detection data transmission unit 205, a learning data transmission unit 206, a model storage unit 207 and an actuator control unit 208.

The detection data that has been acquired by a sensor 300 (or the data on which preprocessing for data analysis has been carried out) is inputted into the data analysis unit 201, which then carries out data analysis on the detection data and samples a characteristics amount that is necessary for the verification. The data analysis unit 201 carries out data analysis by using an inference model (machine learning model or deep learning model) that is stored in the model storage unit 207.

The verification data storage unit 202 is provided with a database function for storing registration data that has been registered in advance for verification with the present system and the accompanying attribution data. The registration data within the verification data storage unit 202 is verified with the characteristic amount of the detection data that has been sampled by the data analysis unit 201. The verification data storage unit 202 only stores part (subset) of the registration data instead of all the registration data that is to be handled in the present system. The registration data stored in the verification data storage unit 202 can differ for each edge server 200. That is to say, the verification data storage unit 202 in each edge server 200 selectively stores the registration data having a high probability of being verified in the edge server 200.

The verification unit 203 verifies the inputted characteristics amount of the detection data that has been sampled by the data analysis unit 201 with the verification data storage unit 202. Concretely, the verification unit 203 searches the verification data storage unit 202 by using the inputted detection data as a key so as to specify the registration data (and its attribution data) that matches the detection data the most, and at the same time acquires the matching degree between the detection data and the registration data. As for the matching degree, various types of values can be used, and values such as the degree of reliability, frequency, Euclidean distance and the like can be used as the matching degree. In the case where a matching degree that exceeds a predetermined determination reference value is acquired as a result of the verification, the verification is determined to be successful (registration data that matches the detection data exists within the verification data storage unit 202), or otherwise the verification is determined to have failed (registration data that matches the detection data does not exist within the verification data storage unit 202). In addition, the verification unit 203 is configured to request a verification to the cloud server 100 so as to gain the verification results in the case where the verification has failed.

The history storage unit 204 stores the history data of the verifications that have been implemented by the verification unit 203. The history data is formed of an ID for identifying each piece of history, the time at which the verification was carried out, detection data (or its characteristics amount), the identification information of the sensor 300 that has acquired the detection data (sensor ID, for example), the identification information of the edge server 200 that has processed the detection data (edge ID, for example), the data on the results of verification (identification information of the registration data that has been searched for, whether or not the verification was successful, and the matching degree, for example) and the like.

The detection data transmission unit 205 transmits the detection data that has been acquired by the sensor 300 (or the data on which preprocessing for data analysis has been carried out) to the cloud server 100. Here, the detection data transmission unit 205 transmits the detection data only in the case where the verification thereof is determined to have failed instead of transmitting all the detection data.

The learning data transmission unit 206 corresponds the detection data that has been acquired by the sensor 300 (or the data on which preprocessing for data analysis has been carried out) to the data on the results of verification by means of the verification unit 203, and transmits the detection data to the cloud server 100 as learning data. Here, the learning data transmission unit 206 transmits only the detection data that satisfies predetermined conditions (described below) instead of transmitting all the detection data.

The model storage unit 207 stores an inference model that is used at the time of data analysis by means of the data analysis unit 201. The inference model within the model storage unit 207 is appropriately updated by an inference model after relearning that is transmitted from the cloud server 100.

The actuator control unit 208 generates a control order for controlling the operation of the actuator 400 on the basis of the verification results by the verification unit 203 (or the cloud server 100), and transmits the control order to the actuator 400. The actuator control unit 208 may generate a control order for controlling the operation of other apparatuses such as the sensor 300 instead of or together with the control order for the actuator 400 so as to transmit the control order to the corresponding apparatus.

Next, the functions of the cloud server 100 are described in reference to FIG. 2. The cloud server 100 is provided with a data analysis unit 101, a verification data storage unit 102, a verification unit 103, a history storage unit 104, a learning data storage unit 105, a learning unit 106, a model storage unit 107 and a verification result transmission unit 108.

The detection data transmitted from the edge server 200 (or the data on which preprocessing for data analysis has been carried out) is inputted into the data analysis unit 101, which then carries out data analysis on the detection data and samples a characteristic amount that is required for the verification. The data analysis unit 101 carries out data analysis by using an inference model that is stored in the model storage unit 107 (machine learning model or deep learning model).

The verification data storage unit 102 is provided with a database function for storing the registration data that has been registered in advance for verification with the present system and the accompanying attribution data. The registration data within the verification data storage unit 102 is verified with the characteristics amount of the detection data that has been sampled by the data analysis unit 101. The verification data storage unit 102 stores all the registration data that is handled by the present system.

The verification unit 103 verifies the inputted characteristics amount of the detection data that has been sampled by the data analysis unit 101 with the verification data storage unit 102. Concretely, the verification unit 103 searches the verification data storage unit 102 by using the inputted detection data as a key so as to specify the registration data (and its attribution data) that matches the detection data the most, and at the same time acquires the matching degree between the detection data and the registration data. In the case where a matching degree that exceeds a predetermined determination reference value is acquired as a result of the verification, the verification is determined to be successful (registration data that matches the detection data exists within the verification data storage unit 102), or otherwise the verification is determined to have failed (registration data that matches the detection data does not exist within the verification data storage unit 102).

The history storage unit 104 stores the history data of the verifications that have been implemented by the verification unit 103. The history data is formed of an ID for identifying each piece of history, the time at which the verification was carried out, detection data (or its characteristics amount), the identification information of the sensor 300 that has acquired the detection data (sensor ID, for example), the identification information of the edge server 200 that has processed the detection data (edge ID, for example), the data on the results of verification (identification information of the registration data that has been searched for, whether or not the verification was successful, and the matching degree, for example) and the like.

The learning data storage unit 105 corresponds the detection data that has been acquired by the sensor 300 (or the data on which preprocessing for data analysis has been carried out) to the data on the results of verification by means of the verification unit 103, and stores the detection data as learning data. Here, the learning data transmission unit 105 stores only the detection data that satisfies predetermined conditions (described below) instead of storing all the detection data. In addition, the learning data storage unit 105 stores the learning data that has been received from the edge server 200.

The learning unit 106 relearns an inference model that is used for data analysis by the data analysis units 101 and 201 on the basis of the learning data stored in the learning data storage unit 105. Relearning of the inference model may be carried out through machine learning, deep learning or other techniques. The learning unit 106 allows the model storage unit 107 to store the relearned inference model, and at the same time transmits the relearned inference model to the edge server 200 so as to be stored in the model storage unit 207 as well. Accordingly, the same newest inference model is stored in the model storage units 101 and 201.

The model storage unit 107 stores the inference model that is used at the time of data analysis by means of the data analysis unit 101. The inference model within the model storage unit 107 is appropriately updated by the inference model that has been relearned in the learning unit 106.

The verification result transmission unit 108 transmits the verification results by means of the verification unit 103 (the searched registration data, whether or not the verification was successful, and the matching degree, for example) to the edge server 200 from which the verified detection data has been transmitted.

Next, the process flow in the present verification system is described in reference to the sequence examples in FIGS. 4 through 7. The following description refers to an example of the case where the present verification system is applied to a facial authentication system for authenticating the image of a face of a person that has been taken by an image pickup device (camera) installed in proximity to an entrance door for a facility as a sensor 300, and for controlling the opening and closing of the door by means of an actuator 400 in response to whether or not the person is a person who has already been registered. In this case, the database (102 or 202) of each server (100 or 200) stores the registration data that includes images of the faces of people who have been registered in advance and their characteristic amounts and the attribution data that includes the sex, age and entrance being permitted/not permitted for each person.

Figure 4:
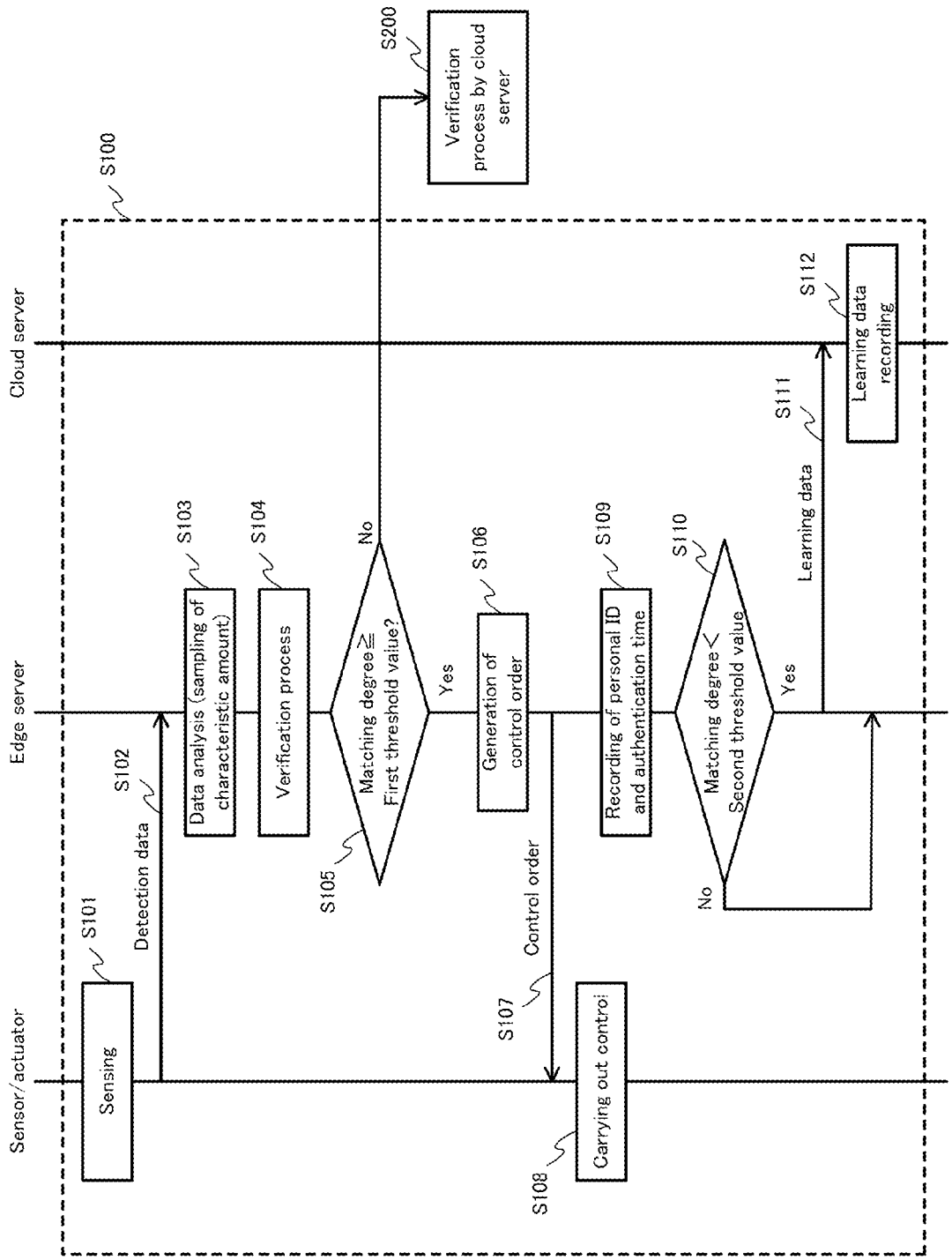
FIG. 4 is a diagram showing an example of a sequence of the verification process in the edge server.

FIG. 4 shows a sequence example of the verification process in the edge server 200.

First of all, the sensor 300 carries out sensing (step S101). The detection data that has been gained through sensing is transmitted to the edge server 200 (step S102). In the present example where an image pickup device is used as the sensor 300, an image of a face of a person is transmitted to the edge server 200 as detection data.

The edge server 200 carries out the following processes upon the reception of the detection data from the sensor 300. First, the data analysis unit 201 carries out data analysis and samples a characteristic amount of the detection data (step S103).

Next, the verification unit 203 searches the verification data storage unit 202 by using the characteristic amount that has been sampled by the data analysis unit 201 as a key so as to specify the registration data (and its attribution data) that matches the detection data the most, and at the same time acquire the matching degree between the detection data and the registration data (step S104). The verification unit 203 compares the matching degree that has been acquired through the verification with a first threshold value, which is a determination reference value (90% in the present example), and determines that the verification was successful in the case where the matching degree is the first threshold value or greater, or otherwise determines that the verification has failed (step S105).

In the case where the verification is determined to have been successful in step S105, the actuator control unit 208 generates a control order on the basis of the attribution data that has been searched for from the verification data storage unit 202 (step S106). In the case where "entrance permitted" is set in the attribution data of the registration data that matches the person whose image has been taken by the camera, for example, a control order for instructing the opening of the door or the unlocking. Conversely, in the case where "entrance not permitted" is set, a control order for instructing the display of a message that states to the effect that the person cannot enter into the facility, the output of an alarm sound, the turning on of a lamp and the like is generated.

The control order generated by the actuator control unit 208 is transmitted to the actuator 400 (or an output apparatus such as a monitor, a speaker or a lamp that is arranged in proximity thereto) (step S107). The actuator 400 (or output apparatus) operates on the basis of the control order received from the edge server 200 (step S108). For example, an operation such as the opening of a door or the unlocking is carried out, or the operation such as the display of a message that states to the effect that the person cannot enter into the facility, the output of an alarm sound, or the turning on of a lamp is carried out.

Furthermore, in the case where the verification has been determined to have been successful in step S105, the edge server 200 allows the history storage unit 104 to store the history data of the verifications that have been carried out by the verification unit 103. The history data is a record or whether or not the verification was successful, the identification information of the registration data that has been successfully verified (personal ID, for example), the time of authentication and the like (step S109).

Next, the learning data transmission unit 206 determines whether or not the learning data is transmitted to the cloud server 100 on the basis of the matching degree that has been acquired through the verification in the verification unit 203 (step S110). The learning data is transmitted under the condition that the matching degree is within a predetermined range. In the present example, the learning data is transmitted to the cloud server 100 in the case where the matching degree is lower than a second threshold value (95%, for example) that defines the upper limit of the predetermined range (step S111). That is to say, the learning data is transmitted in the case where the verification was successful (the matching degree was the first threshold value or greater); however, the reliability thereof is not very high (the matching degree is less than the second threshold value). The cloud server 100 stores the learning data that has been received from the edge server 200 in the learning data storage unit 105 (step S112).

Figure 5:
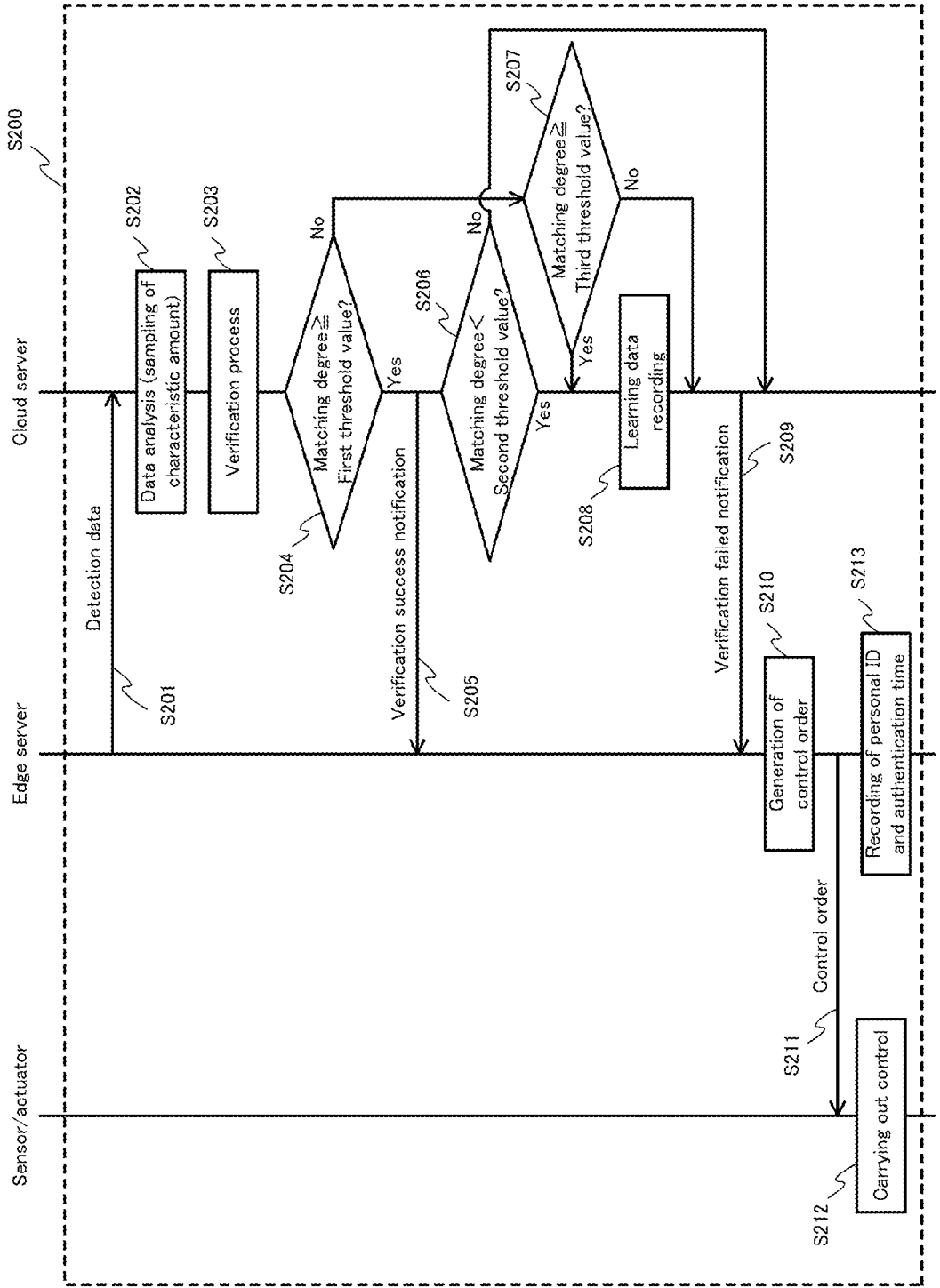
FIG. 5 is a diagram showing an example of a sequence of the verification process in the cloud server.

Meanwhile, in the case where the verification has been determined to have failed in step S105, the procedure shifts to the verification process by means of the cloud server 100 (step S200). FIG. 5 shows a sequence example of the verification process in the cloud server 100.

First, in the edge server 200, the detection data transmission unit 205 transmits the detection data which has failed the verification (the matching degree was less than the first threshold value) to the cloud server 100 (step S201). That is to say, in the case where it has been determined that registration data that matches the detection data does not exist within the database in the edge server 200, the detection data is transmitted to the cloud server 100.

The cloud server 100 carries out the following processes upon the reception of the detection data from the edge server 200. First, the data analysis unit 101 carries out data analysis and samples a characteristic amount of the detection data (step S202).

Next, the verification unit 103 searches the verification data storage unit 102 by using the characteristic amount that has been sampled by the data analysis unit 101 as a key so as to specify the registration data (and its attribution data) that matches the detection data the most, and at the same time acquire the matching degree between the detection data and the registration data (step S203). The verification unit 103 compares the matching degree that has been acquired through the verification with the first threshold value that is a determination reference value (90% in the present example), and determines that the verification was successful in the case where the matching degree is the first threshold value or greater, or otherwise determines that the verification has failed (step S204).

Next, in the case where the verification has been determined to have been successful in step S204, the verification result transmission unit 108 transmits a verification success notification that indicates that the verification by the verification unit 103 was successful to the edge server 200 (step S205). Meanwhile, in the case where the verification has been determined to have failed in step S204, a verification failed notification that indicates that the verification by the verification unit 103 has failed in transmitted to the edge server 200 (step S209). At the time of these notifications, not only whether or not the verification was successful but also the identification data of the searched registration data and its attribution data are also transmitted.

When the edge server 200 receives a verification success notification or a verification failed notification from the cloud server 100, the actuator control unit 208 generates a control order on the basis of the attribution data that has been received together with these notifications (step S210). In the case of a verification success notification, for example, a control order for indicating the opening of the door or the unlocking is generated when "entrance permitted" is set in the attribution data that has been received together with the verification success notification, whereas a control order for indicating the display of a message that states that the person cannot enter the facility, the output of an alarm sound or the turning on of a light is generated when "entrance not permitted" is set. In the case of a verification failed notification as well, a control order for indicating the display of a message that states that the person cannot enter the facility, the output of an alarm sound or the turning on of a lamp is generated.

The control order generated by the actuator control unit 208 is transmitted to the actuator 400 (or the output apparatus such as a monitor, a speaker or a lamp that is arranged in proximity thereto) (step S211). The actuator 400 (or the output apparatus) operates on the basis of the control order that has been received from the edge server 200 (step S212). The examples of the operation are the opening of the doors, the unlocking, the display of a message stating to the effect that the person cannot enter the facility, the output of an alarm sound, the turning on of a lamp and the like.

Furthermore, the edge server 200 stores the history data of the verifications that have been carried out by the cloud server 100 in the history storage unit 104. As the history data, for example, whether or not the verification of being successful, the identification information of the registration data of which the verification was successful (personal ID, for example), the time of authentication and the like are recorded (step S213). Here, in the case where the verification has failed, needless to say, the identification information of the person is not stored.

In addition, the cloud server 100 determines whether or not the learning data is stored in the learning data storage unit 105 on the basis of the matching degree that has been acquired through the verification in the verification unit 103 after the verification process by means of the verification unit 103 (steps S206 and S207). The learning data is stored in the learning data storage unit 105 under the conditions where the matching degree is in a predetermined range. In the present example, the learning data is stored in the case where the matching degree is lower than the second threshold value (95%, for example) that defines the upper limit of the predetermined range when the verification was successful (the matching degree is the first threshold value or greater) (step S208 after "Yes" in step S204 and "Yes" in step S206). Meanwhile, the learning data is stored in the case where the matching degree is no smaller than the third threshold value (85%, for example) that defines the lower limit of the predetermined range when the verification has failed (the matching degree is less than the first threshold value) (step S208 after "No" in step S204 and "Yes" in step S207). That is to say, the learning data is stored in the case where the verification was successful (the matching degree is no less than the first threshold value); however, the reliability thereof is not very high (the matching degree is less than the second threshold value). In addition, the learning data is stored in the case where the verification has failed (the matching degree is less than the first threshold value); however, the reliability thereof is as high as a certain level (the matching degree is no less than the third threshold value).

As for the relationship between the respective threshold values that are compared with the matching degree, the third threshold value the first threshold value the second threshold value. The second threshold value is set in order for the detection data of which the verification was successful but the matching degree was low to be stored as the learning data so that further deterioration of the verification precision can be prevented from being caused in the following verifications. The third threshold value is set in order to store as learning data the detection data having such a possibility that the verification should have been successful in reality from among the detection data of which the verification has failed. It is possible to store all the detection data of which the verification has failed as the learning data without using the third threshold value, which ends up including a large amount of learning data that does not contribute to relearning. Therefore, it can be said that it is preferable to use the third threshold value so that the detection data of which the matching degree is too low can be excluded.

Figure 6:
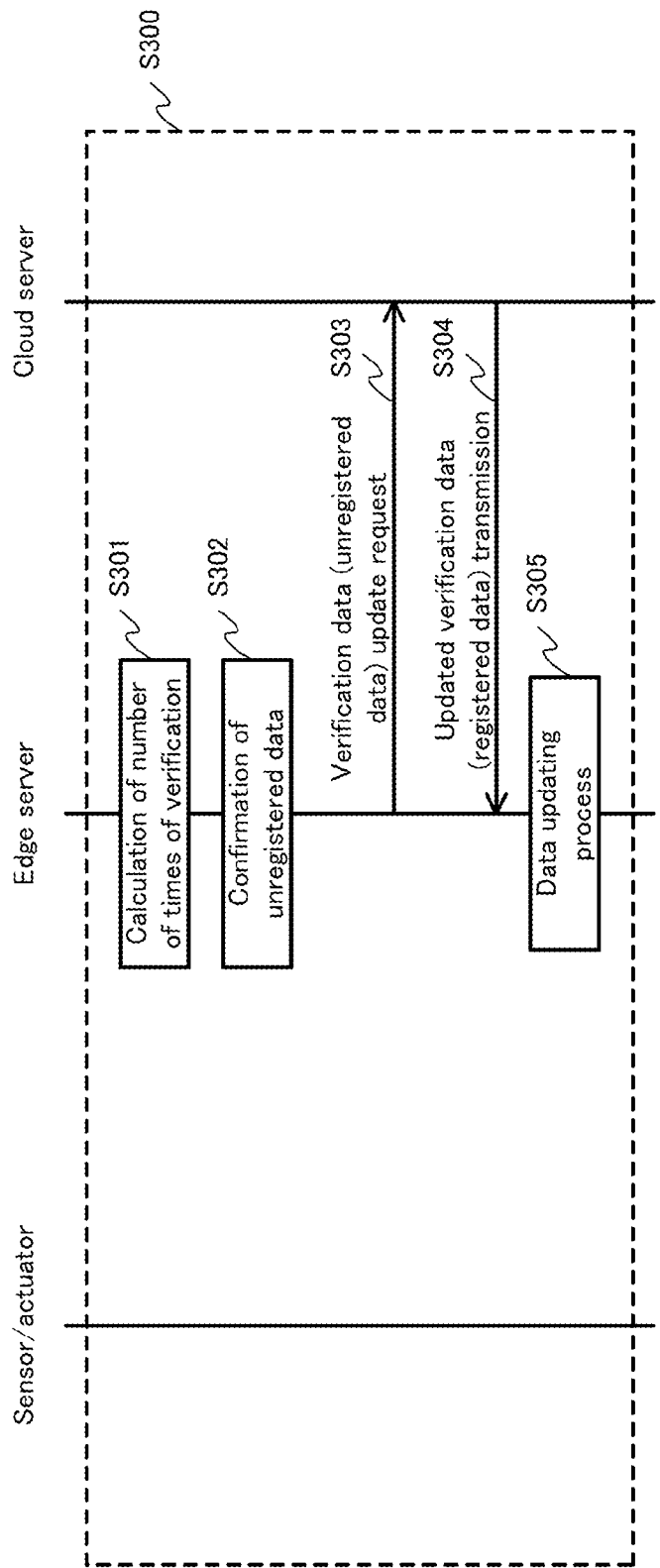
FIG. 6 is a diagram showing an example of a sequence of the database updating process in the edge server.

FIG. 6 shows a sequence example of the database updating process in the edge server 200.

It is desirable for many verifications to be able to be carried out in the edge server 200 in order to reduce the communication load between the edge server 200 and the cloud server 100. People who visit the facility tend to change as time elapses, and therefore, the registration data within the verification data storage unit 202 is updated on demand so that the system can be optimized. The time of the optimization (database update) may be periodic such as once a day or once a month, or may be anytime that is indicated by the system operator. Alternatively, the communication between the edge server 200 and the cloud server 100 may be monitored, and thus, the optimization may be carried out in the case where the number of times of the transmission of a success verification notification from the cloud server 100 becomes a predetermined number of times or greater within a predetermined period.

Upon the arrival of the time at which the optimization is to be carried out, the edge server carries out the following process. First, the latest history data within the history storage unit 204 is collected during a certain period (one day or one month, for example) so that the number of times of verification for each piece of registration data is calculated (step S301). Next, a predetermined number of pieces of registration data is selected in the order of the number of times of verification thereof being greater, and it is confirmed whether or not each of the selected pieces of the registration data exists within the verification data storage unit 202, and thus, the pieces of the registration data that do not exist within the verification data storage unit 202 are specified (step S302).

After that, the edge server 200 transmits a verification data update request for requesting the transmission of pieces of registration data that do not exist within the verification data storage unit 202 to the cloud server 100 (step S303). The cloud server 100 reads out the pieces of registration data that correspond to the verification data update request from the verification data storage unit 102 and transmits the readout registration data to the edge server 200 (step S304). The edge server 200 deletes unnecessary pieces of registration data within the verification data storage unit 202 in the order of the number of times of verification of the pieces being smaller, and allows the registration data that has been received from the cloud server 100 to be stored in the verification data storage unit 202 (step S305).

A concrete example is cited for the following description. In this example, the number of times of the latest verifications (facial authentications) in the edge server 200 is collected in order to prepare the ranking of the times of visitation so that the top 1000 people in the ranking of the times of visitation are specified. The registration data of the people who do not exist within the verification data storage unit 202 from among the specified 1000 people is received from the cloud server 100 so as to be stored in the verification data storage unit 202. At this time, a simple addition of the registration data to the verification data storage unit 202 sometimes causes the number of pieces of registration data to exceed the upper limit (1000 in the present example). In such a case, the exceeded number of pieces of registration data that are selected in the order from the bottom of the ranking of the number of times of visitation is deleted from the verification data storage unit 202, and thus, the number of pieces of the registration data is adjusted.

Here, the edge server 200 may notify the cloud server 100 of the identification information on all the registration data held by the edge server 200 itself (a list of personal IDs, for example). As a result, the cloud server 100 can grasp which edge server 200 holds which pieces of registration data at that time. In addition, in the case where the registration data is changed in the cloud server 100, the above-described sharing of information makes it possible for the cloud server 100 to transmit the newest registration data to the edge server 200 that holds the corresponding registration data so that the verification data storage unit 202 is updated. As a result, the edge server 200 can carry out a verification by using the newest registration data, and at the same time, the cloud server 100 can share the information of the registration data held by each edge server 200.

Figure 7:
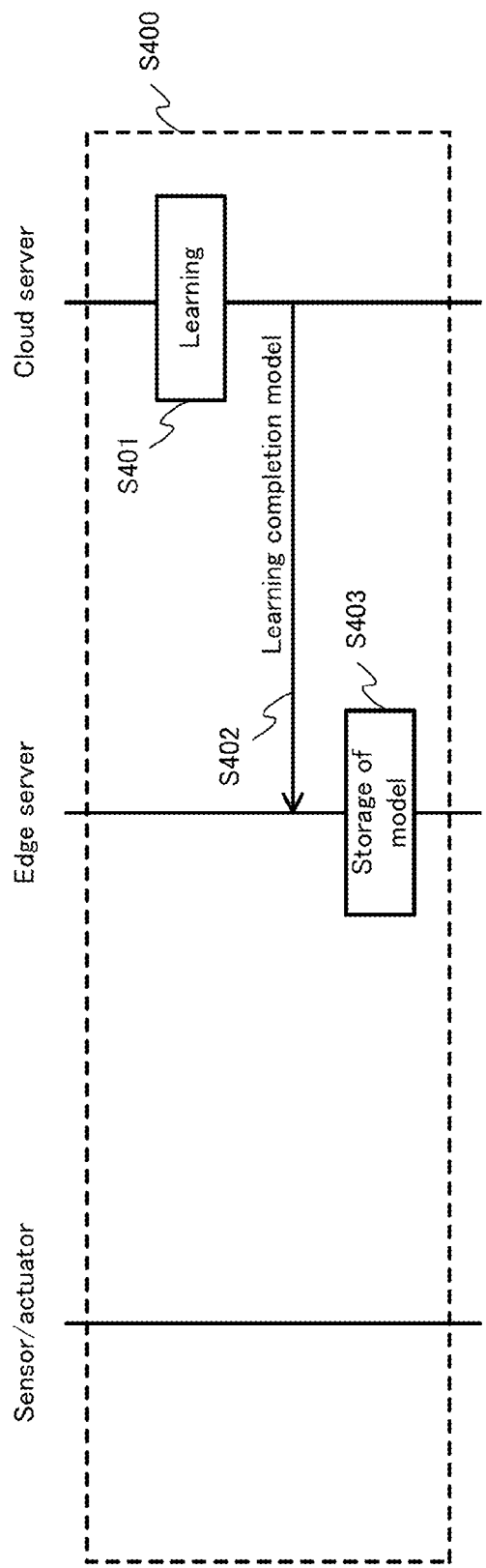
FIG. 7 is a diagram showing an example of a sequence of the relearning process in an inference model.

FIG. 7 shows a sequence example of the relearning process of an inference model.

It is desirable for the inference model to be able to be updated so that the deterioration of the verification precision can be suppressed, and the system can be continuously operated stably in order to respond to the change of people's faces as time elapses and the change in the background or the environment as time elapses. The time at which the inference model is updated may be periodic such as once a day or once a month or may be any time that is indicated by the system operator. Alternatively, the optimization may be carried out in the case where no less than a certain number of pieces of learning data is transmitted to the cloud server 100 due to the matching degree being low when the verification was successful in the edge server 200, or in the case where the number of times of transmission of the learning data from the edge server 200 becomes no less than a predetermined number of times within a predetermined period of time. Here, it is necessary to manually correct the data of which the verification has failed prior to the relearning of the inference model. In addition, the data of which the verification was successful may also be manually corrected so that precise learning can be carried out.

Upon the arrival of the time at which relearning of the inference model is to be carried out, the cloud server 100 carries out the following process. First, the learning unit 106 relearns an inference model on the basis of the learning data stored in the learning data storage unit 105 (step S401). The learning unit 106 may carry out new learning or may carry out learning by using only new learning data in accordance with a publicly-known method called fine tuning. In addition, new learning or fine tuning may be carried out by using only the learning data of which the frequency of use is high. The learning unit 106 allows the newest inference model that has been gained through the relearning to be stored in the model storage unit 107, and at the same time transmits the newest inference model to the edge server 200 (step S402).

The edge server 200 allows the newest inference model that has been received from the cloud server 100 to be stored in the model storage unit 207 and to be used for the following data analysis by the data analysis unit 201 (step S403).

Here, the inference model may be updated through overwriting. Alternatively, the previous inference model may be stored in such a manner as being able to be returned, taking the possibility of the precision of the updated model deteriorating into consideration. The previous inference model may be stored only in the model storage unit 107 in the cloud server 100 or may be stored additionally in the model storage unit 207 in the edge server 200.

As described above, in the verification system in the present example, the cloud server 100 holds the main database (102) for storing all the registration data that is handled in the present system, and the edge server 200 that is arranged close to the sensor 300 holds a sub-database (202) for storing part of the registration data. The sub-database (202) in the edge server 200 stores only the registration data having a high probability of being verified in the edge server 200. In the case where the edge server 200 verifies the detection data that has been acquired by the sensor 300 with the registration data within the sub-database and determines that the registration data that matches the detection data does not exist within the sub-database, the configuration allows the detection data to be transmitted to the cloud server 100 and requests the detection data to be verified with the registration data within the main database.

Accordingly, only the part of the detection data that has failed the verification is verified in the cloud server 100 after the verification in the edge server 200. As a result, the process load of the cloud server 100 can be reduced, and the communication load between the edge server 200 and the cloud server 100 can be reduced. In addition, most parts of the detection data can be verified in the edge server 200 that is located close to the sensor 300, and therefore, the verification results can be gained instantly. Furthermore, even in the case where the registration data fails to be synchronized between the edge server 200 and the cloud server 100 (for example, in the case where new registration data is not registered with the edge server 200), the failure in the verification in the edge server 200 can be recovered in the cloud server 100, which makes the verification possible by using the newest registration data.

In addition, the arrangement of a plurality of edge servers 200 (an edge server 200 is arranged for each base, for example) makes it possible to disperse the load of verification from among the respective edge servers 200, and thus, a further reduction in the load can be achieved. Moreover, an analysis process in a plurality of edge servers 200 makes it possible for a small-scale equipment process to carry out simple machine learning. As a result, easy and simple machine learning becomes possible, which substitutes for a conventional large-scale AI engine.

According to the above description, in the case where the verification in the edge server 200 has failed, the detection data itself is transmitted to the cloud server 100 in order to request the verification; however, part of the detection data or a characteristic amount of the detection data may be transmitted. For example, an image of a portion to which attention should be paid and that has been cut out from a facial image, which is the detection data, or the information on the distances from among the facial parts such as the eyes, nose and mouth may be transmitted as a characteristic amount of the detection data. As a result, the amount of data that is transmitted can be reduced, and thus, the communication load can be reduced. Furthermore, it becomes unnecessary for the cloud server 100 to carry out data analysis, and thus, the process load of the cloud server 100 can also be reduced.

According to the above description, learning data (detection data and data of the verification results) is appropriately transmitted from the edge server 200 to the cloud server 100; however, the learning data may be temporarily stored in a memory within the edge server 200 so as to be transmitted to the cloud server 200 at a predetermined time. For example, the learning data may be transmitted at the time when the stored amount of data exceeds a predetermined value, at the time when the random value that is periodically calculated exceeds a predetermined value, or during a predetermined time band such as at night when the traffic is less (off-peak time when the effects of the load are smaller). In addition, instead of transmitting the detection data itself as learning data, part of the detection data or a characteristic amount of the detection data may be transmitted as learning data. For example, an image of a portion to which attention should be paid and that has been cut out from a facial image, which is the detection data, or the information on the distances from among the facial parts such as the eyes, nose and mouth may be transmitted as learning data. In this manner, the frequency at which the learning data is transmitted is reduced or the amount of data that is transmitted is reduced, which makes it possible to reduce the communication load in the transmission of the learning data.

According to the above description, an example of the case where the verification system in the present example is applied to a facial authentication system is cited; however, it is not necessary to say that the verification system can be applied to other systems. For example, the verification system may be applied to an apparatus control system where the occurrence of an event is specified on the basis of the detection data that is gained from the sensors installed in respective places within a factory, the control contents to be carried out in response to the event are searched for from a database, and the corresponding actuators are operated under control. In this case, the databases in the cloud server 100 and the edge servers 200 may store a plurality of pieces of registration data on preset events, and the attribution data on the controls to be carried out in response to the events.

Though the present invention is described in detail in reference to the embodiments, the present invention is not limited to the verification systems disclosed herein, and it is needless to say that the present invention can be widely applied to verification systems other than the above.

It is also possible for the present invention to be provided as a method or a system for carrying out the process according to the present invention, a program for implementing such a method or a system, or a recording medium for storing such a program.

INDUSTRIAL APPLICABILITY

The present invention can be applied to various types of verification systems for verifying the detection data acquired by the detection apparatus with the registration data that has been registered in advance.

REFERENCE SIGNS LIST

100: cloud server
200: edge server
300: sensor
400: actuator
101: data analysis unit
102: verification data storage unit
103: verification unit
104: history storage unit
105: learning data storage unit
106: learning unit
107: model storage unit
108: verification result transmission unit
201: data analysis unit
202: verification data storage unit
203: verification unit
204: history storage unit
205: detection data transmission unit
206: learning data transmission unit
207: model storage unit
208: actuator control unit

The invention claimed is:

1. A verification system for verifying detection data acquired by a detection apparatus with registration data that has been registered in advance, the verification system comprising:
a first verification server having a main database for storing all the registration data; and
a second verification server which is arranged closer to the detection apparatus than the first verification server and has a sub-database for storing part of the registration data,
a first threshold value, which is a predetermined determination reference value to be used for the determination of whether or not the verification is successful, a second threshold value that is greater than the first threshold value, and a third threshold value that is smaller than the first threshold value,
wherein the second verification server is configured to analyze the detection data that has been acquired by the detection apparatus, verify the analyzed detection data with the registration data within the sub-database, determine that in the case where the matching degree which is calculated for the registration data that matches the detection data the most is no smaller than the first threshold value, the verification is successful, otherwise, the verification is failure, and transmit the detection data to the first verification server for further verification in the case where the verification is failure,
the second verification server is further configured to transmit the detection data, in the case where the verification is successful and the matching degree is no greater than the second threshold value, with a verification result data indicating the verification is successful to the first verification server for storing as learning data in order to learn an inference model for data analysis,
the first verification server is configured to analyze the detection data that has been received from the second verification server in the case where the verification is failure, verify the analyzed detection data with the registration data within the main database, determine that in the case where the matching degree which is calculated for the registration data that matches the detection data the most is no smaller than the first threshold value, the verification is successful, otherwise, the verification is failure, and transmit the verification results to the second verification server, and
the first verification server is further configured to store detection data with a verification result data indicating the verification is successful as the learning data in the case where the matching degree is no smaller than the first threshold value and no greater than the second threshold value, and store the detection data with the data on the results of the verification is failure as the learning data in the case where the matching degree is no greater than the first threshold value and no smaller than the third threshold value.

2. The verification system according to claim 1 wherein the first and second verification servers respectively have a data analysis unit that analyzes detection data, a verification unit that calculates the matching degree between the detection data and the registration data on the basis of the results of analysis by the data analysis unit, and a model storage unit that stores an inference model to be used for the analysis in the data analysis unit, and
the respective model storage units in the first and second verification servers store the same inference model.

3. The verification system according to claim 2, wherein
the verification unit in the second verification server compares the calculated matching degree with the first threshold value so as to determine whether or not registration data that matches the detection data which has been acquired by the detection apparatus exists within the sub-database, and
the verification unit in the first verification server compares the calculated matching degree with the first threshold value so as to determine whether or not registration data that matches the detection data which has been acquired by the detection apparatus exists within the main database.

4. The verification system according to claim 2, wherein the first verification server has: a learning data storage unit that stores detection data that has been acquired by the detection apparatus as learning data in the case where the matching degree calculated by the first or second verification server on the basis of the detection data is no smaller than the third threshold value and no greater than the second threshold value; and a learning unit that relearns an inference model on the basis of the learning data stored in the learning data storage unit.

5. The verification system according to claim 4, wherein the first verification server stores an inference model that has been relearned by the learning unit in its own model storage unit and at the same time transmits the inference model to the second verification server, and
the second verification server stores the inference model that has been received from the first verification server in its own model storage unit.

6. The verification system according to claim 1, wherein the second verification server calculates the number of times of verification for each piece of registration data on the basis of the history of the results of verifications by means of the first or second verification server, selects a predetermined number of pieces of registration data in the order of the number of times of verification thereof being greater so as to confirm whether or not each selected piece of registration data exists within the sub-database, and receives the pieces of registration data that do not exist within the sub-database from the first verification server so as to store the received pieces of registration data in the sub-database.

7. The verification system according to claim 1, by being applied to a facial authentication system for acquiring a face image of a person as detection data by means of an image pickup device, which is the detection apparatus, in order to determine whether or not the person is a person who has already been registered by verifying the face image with the registration data.

8. A verification server for verifying detection data acquired by a detection apparatus with registration data that has been registered in advance, wherein
the verification server has a main database for storing all the registration data, and another verification server is arranged closer to the detection apparatus than the verification server and has a sub-database for storing part of the registration data,
said another verification server is configured to analyze the detection data that has been acquired by the detection apparatus, verify the analyzed detection data with the registration data within the sub-database, determine that in the case where the matching degree which is calculated for the registration data that matches the detection data the most is no smaller than the first threshold value, the verification is successful, otherwise, the verification is failure, and transmit the detection data to the verification server for further verification in the case where the verification is a failure, and
said another verification server is further configured to transmit the detection data, in the case where the verification is successful and the matching degree is no greater than the second threshold value, with a verification result data indicating the verification is successful to the first verification server for storing as learning data in order to learn an inference model for data analysis,
the verification server is configured to analyze the detection data that has been received from said another verification server in the case where the verification is failure, verify the analyzed detection data with the registration data within the main database, determine that in the case where the matching degree which is calculated for the registration data that matches the detection data the most is no smaller than the first threshold value, the verification is successful, otherwise, the verification is failure, and transmit the verification results to the sub-verification server, and
the verification server if further configured to store detection data with a verification result data indicating the verification is successful as the learning data in the case where the matching degree, is no smaller than the first threshold value and no greater than the second threshold value, and store the detection data with the data on the results of the verification is failure as the learning data in the case where the matching degree is no greater than the first threshold value and no smaller than the third threshold value.

9. A verification server for verifying detection data acquired by a detection apparatus with registration data that has been registered in advance, wherein
another verification server has a main database for storing all the registration data, and the verification server is arranged closer to the detection apparatus than said another verification server and has a sub-database for storing part of the registration data,
a first threshold value, which is a predetermined determination reference value to be used for the determination of whether or not the verification is successful, a second threshold value that is greater than the first threshold value, and a third threshold value that is smaller than the first threshold value,
said another verification server is configured to analyze the detection data that has been received from the verification server, verify the analyzed detection data with the registration data within the main database, determine that in the case where the matching degree which is calculated for the registration data that matches the detection data the most is no smaller than the first threshold value, the verification is successful, otherwise, the verification is failure, and transmit the verification results to the verification server for further verification in the case where the verification is failure,
said another verification server is further configured to transmit the detection data, in the case where the verification is successful and the matching degree is no greater than the second threshold value, with a verification result data indicating the verification is successful to the first verification server for storing as learning data in order to learn an inference model for data analysis, the verification server is configured to analyze the detection data that has been received from said another verification server in the case where the verification is failure, verifies the analyzed detection data acquired by the detection apparatus with the registration data within the sub-database, determine that in the case where the matching degree which is calculated for the registration data that matches the detection data the most is no smaller than the first threshold value, the verification is successful, otherwise, the verification is failure, and transmit the detection data to said another verification server and receive the verification results by said another verification server in the case where it has been determined that no registration data that matches the detection data exists within the sub-database, and the verification server is further configured to store detection data with a verification result data indicating the verification is successful as the learning data in the case where the matching degree, is no smaller than the first threshold value and no greater than the second threshold value, and store the detection data with the data on the results of the verification is failure as the learning data in the case where the matching degree is no greater than the first threshold value and no smaller than the third threshold value.

* * * * *